(12) United States Patent
Jackson et al.

(10) Patent No.: US 6,931,340 B2
(45) Date of Patent: Aug. 16, 2005

(54) SELF-CALIBRATING, MULTI-CAMERA MACHINE VISION MEASURING SYSTEM

(75) Inventors: David A. Jackson, Los Gatos, CA (US); Michael J. Robb, San Jose, CA (US); Donald L. Walchuk, Conway, AR (US)

(73) Assignee: Snap-On Incorporated, Pleasant Prairie, WI (US)

(*) Notice: Subject to any disclaimer, the term of this patent is extended or adjusted under 35 U.S.C. 154(b) by 0 days.

(21) Appl. No.: 10/162,554

(22) Filed: Jun. 6, 2002

(65) Prior Publication Data

US 2003/0065466 A1 Apr. 3, 2003

Related U.S. Application Data

(62) Division of application No. 09/576,442, filed on May 22, 2000.

(51) Int. Cl.$^7$ .............................................. G01C 17/38
(52) U.S. Cl. ...................... 702/94; 33/203.18; 356/620; 356/135; 356/139.09
(58) Field of Search ................................. 356/620, 155, 356/139.09; 33/203.18; 702/94

(56) References Cited

U.S. PATENT DOCUMENTS

| | | | |
|---|---|---|---|
| 4,319,838 A | * | 3/1982 | Grossman et al. ..... 356/139.09 |
| 4,439,925 A | * | 4/1984 | Lock ........................... 33/645 |
| 4,629,317 A | * | 12/1986 | January et al. ............. 356/155 |
| 5,513,439 A | * | 5/1996 | Brauer et al. ............ 33/203.18 |
| 5,535,522 A | | 7/1996 | Jackson |
| 6,298,284 B1 | | 10/2001 | Burns, Jr. et al. |
| 6,424,411 B1 | | 7/2002 | Rapidel et al. |
| 6,594,600 B1 | * | 7/2003 | Arnoul et al. ................ 702/94 |

| | | |
|---|---|---|
| 2002/0080343 A1 | | 6/2002 Bux et al. |

FOREIGN PATENT DOCUMENTS

| | | |
|---|---|---|
| DE | 29 48 573 A1 | 12/1979 |
| DE | 4041723 | 12/1992 |
| EP | 0149690 | 7/1985 |
| EP | 0 948 760 B1 * | 10/1999 |
| EP | 1003011 | 5/2000 |
| FR | 2764992 | 6/1997 |
| WO | WO 99/22281 | 5/1999 |
| WO | WO00/16121 | 3/2000 |
| WO | WO 01/71280 A2 | 9/2001 |

* cited by examiner

*Primary Examiner*—Bryan Bui
*Assistant Examiner*—Stephen J. Cherry
(74) *Attorney, Agent, or Firm*—McDermott Will & Emery LLP

(57) ABSTRACT

An apparatus and method for calibrating machine vision measuring systems that have more than one camera are disclosed. A first calibration target is mounted in a fixed relationship to a first camera of the machine vision measuring system. A third camera mounted in a fixed relationship to a second camera of the machine vision measuring system. Second and third calibration targets are mounted in a fixed relationship to one another and viewable by the first camera and by the third camera. A data processor is programmed to compute calibration of the first camera and the second camera, based on a position of the second calibration target relative to the third calibration target and based on a position of the first camera with respect to the third camera. The apparatus and method provide a way to continuously measure the positions of two or more cameras used in the measuring system, and to use such measurements to calibrate the system. If the cameras move with respect to each other, their respective positions are calculated and used in subsequent measurements. The apparatus and method enable a machine vision measuring system to be used without field calibration at the time of installation.

4 Claims, 11 Drawing Sheets

SELF-CALIBRATING, MULTI-CAMERA MACHINE VISION MEASURING SYSTEM

This application is a divisional of application Ser. No. 09/576,442, filed May 22, 2000.

FIELD OF THE INVENTION

The present invention generally relates to calibrating machine vision measuring systems that have more than one camera, and relates more specifically to apparatus and methods that provide automatic self-calibration of computer-aided, three-dimensional aligners for motor vehicle wheels.

BACKGROUND OF THE INVENTION

Machine vision measuring systems that have more than one camera are used in many applications. For example, wheels of motor vehicles may be aligned on an alignment rack using a computer-aided, three-dimensional (3D) machine vision alignment apparatus and a related alignment method. Examples of methods and apparatus useful in 3D alignment of motor vehicles are described in U.S. Pat. No. 5,724,743, Method and apparatus for determining the alignment of motor vehicle wheels, and U.S. Pat. No. 5,535,522, Method and apparatus for determining the alignment of motor vehicle wheels. The apparatus described in these references is sometimes called a "3D aligner" or "aligner."

To determine the alignment of the motor vehicle wheels, such 3D aligners use cameras that view targets affixed to the wheels. These aligners generally require a calibration process to be performed after the aligner is initially installed at the work site. In order to accurately determine the position between the wheels on one side of the vehicle and the wheels on the other side of the vehicle, the aligner must know where one camera is positioned with respect to the other camera. According to one calibration method, a large target is positioned in the field of view of the cameras, typically along the centerline of the alignment rack, and away from the cameras. Information obtained from each camera is then used to determine the relative positions and orientations of the cameras. Since each camera indicates where the target is with respect to itself, and since each is viewing the same target, the system can calculate where each camera is located and oriented with respect to the other. This is called a relative camera position (RCP) calibration.

Such calibration allows the results obtained from one side of the vehicle to be compared to the other. Thus, by mounting the two cameras rigidly with respect to each other and then performing an RCP calibration, the system can be used to locate the wheels on one side of the vehicle with respect to the other side of the vehicle from that point on. The RCP transfer function is used to convert one camera's coordinate system into the other camera's coordinate system so that a target viewed by one camera can be directly related to a target viewed by the other camera. One approach for performing an RCP is disclosed in U.S. Pat. No. 5,809,658, entitled "Method and Apparatus for Calibrating Cameras Used in the Alignment of Motor Vehicle Wheels," issued to Jackson et al. on Sep. 22, 1998.

While RCP calibration is accurate, it requires special fixtures and a trained operator to perform. Thus, there is a need for an easier, simpler calibration process for an aligner.

Further, even after calibration is performed, the aligner may lose calibration over time. The aligner disclosed in the foregoing references has cameras mounted on a boom that is designed to minimize loss of calibration. However, if the cameras are jarred or dismounted, or if the boom itself is bent, the aligner will lose calibration. The aligner cannot detect loss of calibration itself. Loss of calibration normally is not detected unless the technician performs a calibration check or a full calibration. A long time may elapse before the technician realizes that the aligner is out of calibration.

In addition, the boom is large, expensive and presents an obstacle to vehicles entering and leaving the alignment rack. "Drive-through" alignment approaches may be used wherein a vehicle is driven forward into a service facility, aligned, and then driven forward to exit the service facility. This enables other motor vehicles to queue up behind the vehicle being serviced, improving the speed and efficiency of alignment services. In one approach of drive-through alignment that has a rigid boom, it is necessary to raise the camera boom out of the way as each vehicle passes through. This can be time-consuming, costly, and clumsy.

Based on the foregoing, there is a clear need in this field for an apparatus and method that provides for automatic self-calibration of machine vision measuring systems that have more than one camera.

There is also a need for an aligner that may be installed at an alignment service facility without calibration at the installation site, thereby eliminating extra hardware and the need for a trained operator.

There is also a need for an aligner that can automatically re-calibrate itself if its cameras are jarred or dismounted, or if the boom is bent.

There is also a need for an aligner that may be re-calibrated quickly when a technician determines that the aligner was measuring incorrectly, or when a technician suspects that the relative position of cameras of the aligner has changed.

It would also be advantageous to have a 3D aligner that would not require a rigid mounting boom for operation, thereby enabling drive-through alignment without the need to raise the beam and cameras.

SUMMARY OF INVENTION

The foregoing needs and objects, and other needs that will become apparent from the following description, are fulfilled by embodiments of the present invention, which comprise, in one aspect, an apparatus for calibrating a machine measuring system. In one embodiment, the machine measuring system, having a first camera and a second camera, comprises a first calibration target mounted in a predetermined relationship to the first camera of the machine vision measuring system, and a third camera mounted in a predetermined relationship to the second camera of the machine measuring system. The calibration target is viewed from the third camera. A data processor is configured to compute a relative camera position value of the machine measuring system based on a relative position of the first calibration target to the third camera; wherein the relative camera position value represents the relative position of the first camera to the second camera. This calibration can be done frequently, for example, each time that the first and second camera measures items of interest, such as wheel targets.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for automatic calibration of a machine vision measuring system that has more than one camera is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Structural Overview

Figure 1:
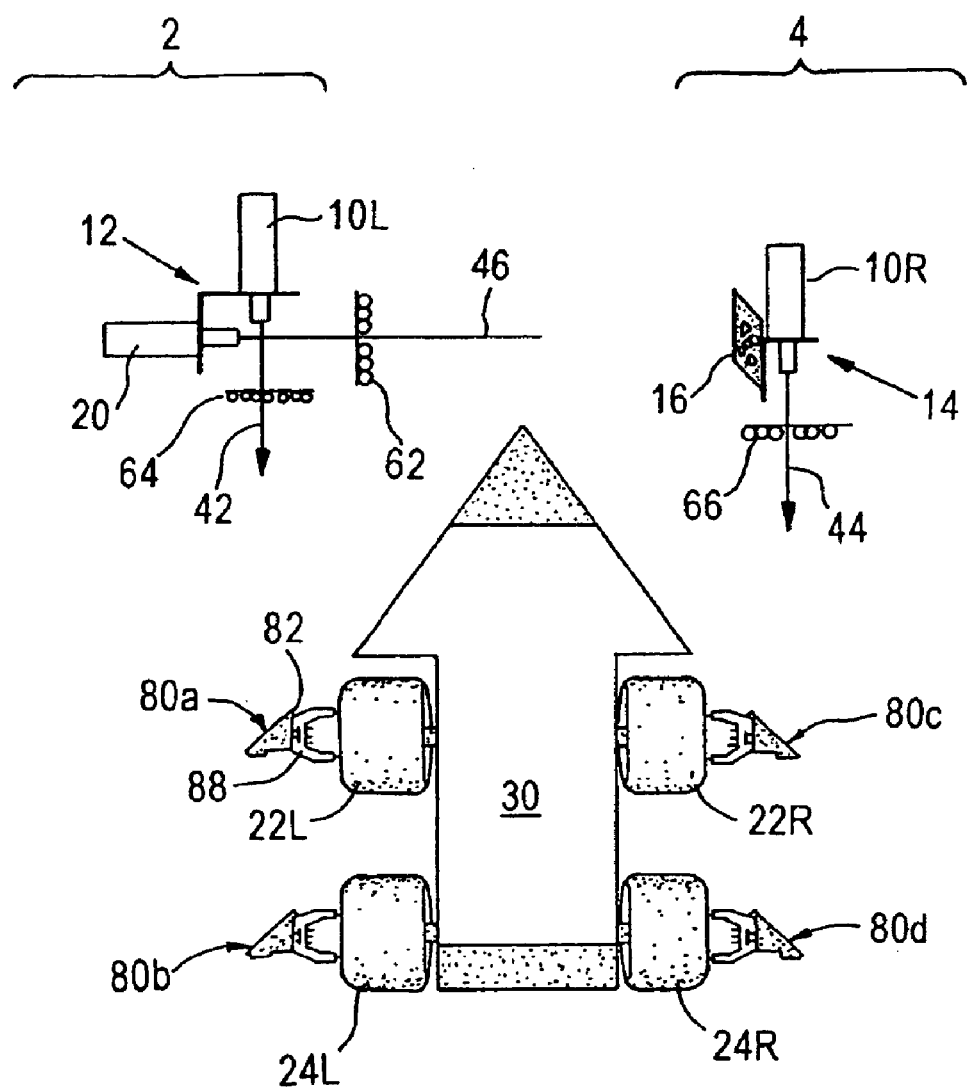
FIG. 1 is a schematic top plan view of a 3D motor vehicle alignment system.

FIG. 1 is a schematic top plan view of certain elements of a computer-aided, 3D motor vehicle wheel alignment system ("aligner") generally comprising a left camera module 2 and a right camera module 4 that are used to align wheels of a motor vehicle. Such an aligner is an example of a machine vision measuring system that has more than one camera, however, the present invention is not limited to the context of a motor vehicle aligner; it is equally applicable to any machine vision measuring system that has more than one camera or any machine measuring system that has more than one measuring device. In addition, the terms "left" and "right" are used for convenience, and are not intended to require a particular element to be located in a particular location or relationship with respect to another element. Any element that is stated to be a "left" element may be placed in a "right" location, and the converse is also true.

Arrow 30 schematically represents a motor vehicle undergoing alignment. The vehicle includes left and right front wheels 22L, 22R and left and right rear wheels 24L, 24R. An alignment target 80a, 80b, 80c, 80d is secured to each of the wheels 22L, 22R, 24L, 24R, respectively. Each alignment target generally comprises a plate 82 on which target information is imprinted and a clamping mechanism 88 for securing the target to a wheel.

The left camera module 2 comprises a left alignment camera 10L and a calibration camera 20. Left alignment camera 10L faces the vehicle and views the left side targets 80a, 80b along axis 42. The left alignment camera 10L may serve as one of the alignment cameras in the aligner described in U.S. Pat. No. 5,724,743, Method and apparatus for determining the alignment of motor vehicle wheels, and U.S. Pat. No. 5,535,522, Method and apparatus for determining the alignment of motor vehicle wheels. Camera 10L is rigidly mounted to left rigid mount 12.

A calibration camera 20 faces the right camera module 4 and views a calibration target 16 along axis 46. The calibration camera 20 also is affixed rigidly to mount 12. In one embodiment, axis 42 and axis 46 subtend an angle of about 90 degrees; however, this particular angular relationship is not required or necessary.

In this exemplary embodiment, calibration camera 20 is illustrated as forming a part of left camera module 2. However, the calibration camera 20 also may be configured as part of right camera module 4, in which case its view would be directed leftward toward left camera module 2.

Right camera module 4 comprises a right camera 10R that faces the vehicle and functions as a second alignment camera in a 3D alignment system. Right camera 10R is affixed to a rigid camera mount 14. Calibration target 16 is rigidly affixed to camera mount 14 in a position visible to calibration camera 20 along axis 46.

Calibration camera 20 and left camera 10L are fixed in predetermined, known positions. Similarly, right camera 10R and calibration target 16 are fixed in pre-determined, known positions. Thus, the relative position of calibration camera to left camera 10L is known, and the relative position of right camera 10R to calibration target 16 is also known. The relative positions of the two cameras contained in the left camera module can be obtained by using precision camera mounting hardware. Another approach would be to factory calibrate the two camera positions and store them for later use.

The mounting of left camera 10L and calibration camera 20 to left mount 12 is required to be stable to avoid introduction of calibration errors, which could arise if the cameras move with respect to the mount. Similarly, the mounting of right camera 10R and calibration target 16 to mount 14 is required to be stable.

For illuminating the calibration target 16 and wheel targets 80a–80d, left camera module 2 and right camera module 4 further may comprise light sources 62, 64, 66. In one embodiment, a first light source 62 is aligned perpendicular to axis 46 to direct light along that axis to illuminate calibration target 16; a second light source 64 is aligned perpendicular to axis 42 to direct light along that axis to illuminate left side wheel targets 80a, 80b; and a third light source 66 is aligned perpendicular to axis 44 to direct light along that axis to illuminate right side wheel targets 80c, 80d. In one embodiment, each of the light sources 62, 64, 66 comprises a circuit board or other substrate on which a plurality of light-emitting diodes (LEDs) are mounted, facing the direction of illumination. However, any other light source may be used.

Figure 2:
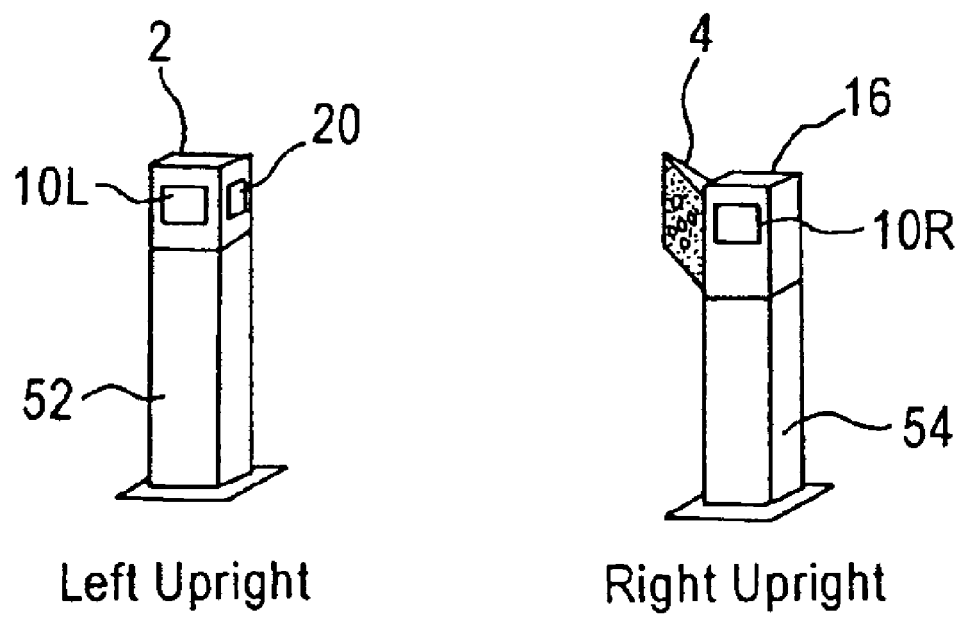
FIG. 2 is a diagram of upright elements of an alignment system.

FIG. 2 is a diagram of an alternate embodiment in which an alignment system includes a left upright 52 and a right upright 54. Each upright 52, 54 may comprise a rigid post that is affixed to an alignment rack or to the floor of a service facility. Left alignment camera 10L and calibration camera 20 are mounted within left upright 52, which serves as a protective enclosure and a rigid mount. The cameras may view the motor vehicle under alignment and the calibration target 16 through suitable apertures or windows in the upright 52. Right alignment camera 10R is mounted and enclosed within right upright 54, and camera 10R may view the vehicle through a suitable aperture or window in right upright 54.

Calibration target 16 may be affixed to an outer surface of upright 54 in a position visible to calibration camera 20. Alternatively, calibration target 16 may be affixed within the upright 54 and viewed by calibration camera 20 through a suitable aperture or window in upright 54.

Light sources 62, 64, 66 may be affixed to exterior surfaces of uprights 52, 54.

Overview of Calibrating the First Camera Module (the First and Third Cameras)

Before the aligner can be used, the relative positions of the components of each of the camera modules or pods (one pod having the first and third cameras, a second pod having the second camera and calibration target) must be determined.

If the rigid mount 12 is manufactured to high tolerances (e.g., 0.01" and 0.01°), then the relative positions of the left camera 10L and the calibration camera 20 are known and there is no need to calibrate the relative positions of the two cameras. Their relative positions will be known and the same for all assemblies. However, as a method of reducing the cost, the relative positions of each of the cameras or target in the pods may be calibrated or measured.

Figure 6A:
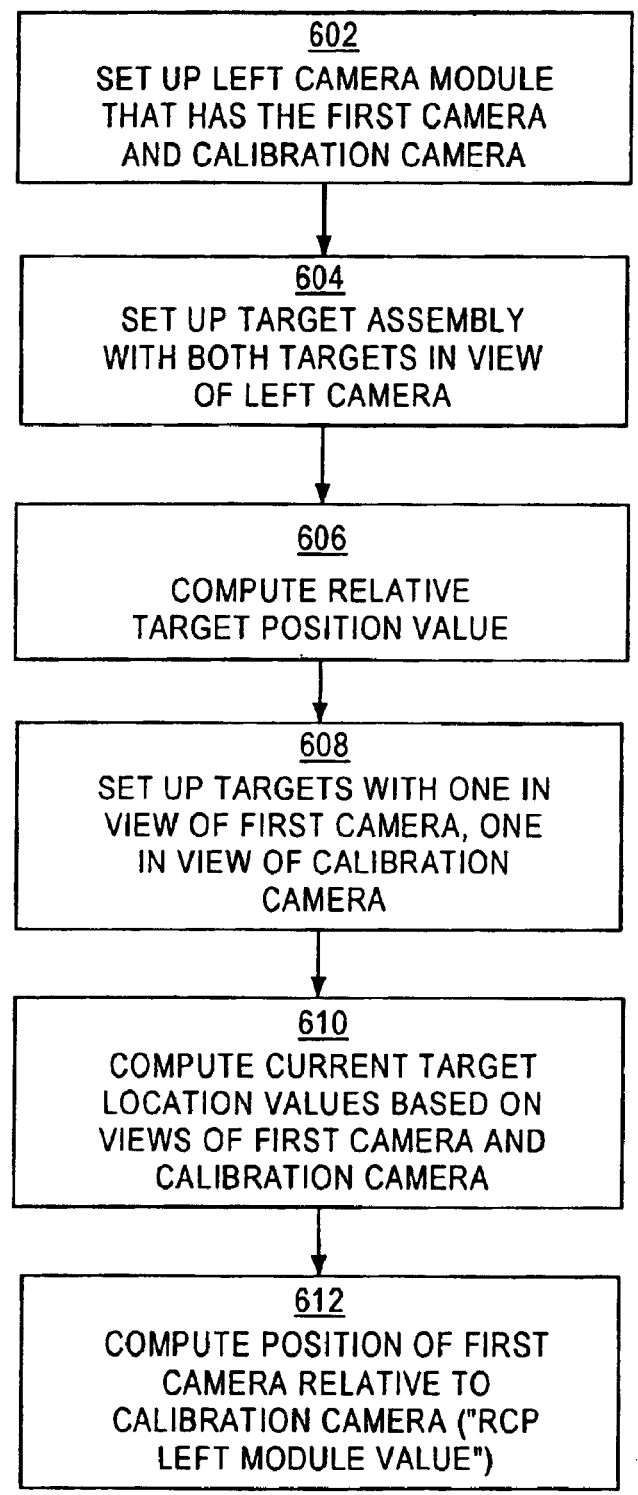
FIG. 6A is a flow diagram illustrating a process of calibrating a camera module having two cameras.

FIG. 6A is a flow diagram of a process of calibrating a first camera module of a machine vision measurement system having more than two cameras.

In general, in one embodiment calibration of the left camera module 10L involves placing two targets that are rigidly mounted to one another in the field of view of one of the cameras. That camera could be either one of the three cameras or for the interest of easy set up for manufacturing any other camera. The computer calculates the relative positions of the two targets (RTP). Then, the targets are moved so that the first camera sees one target, and the third camera sees second target. Measurements of the target positions are computed. Based on the RTP and the just measured positions of the targets, the positions of the first camera and the third camera are computed.

This sub-process of calibrating the relative position of an alignment camera and the calibration camera is now described with reference to FIG. 3A, FIG. 3B, FIG. 3C, FIG. 3D, and FIG. 6A.

Figure 3A:
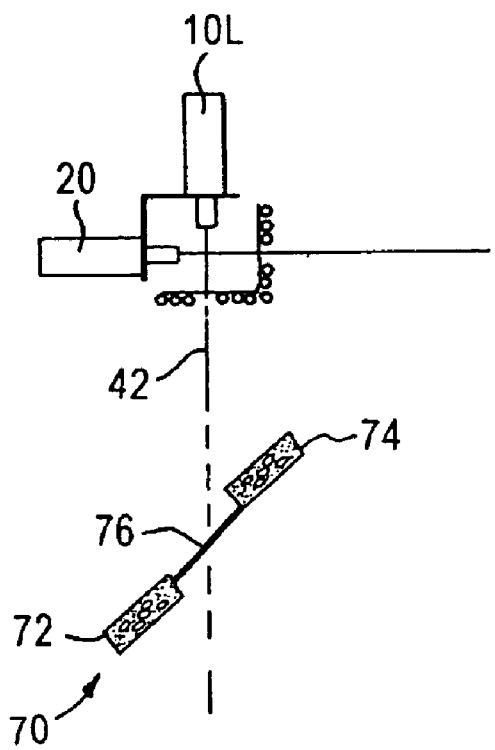
FIG. 3A is a diagram of an apparatus that may be used in the step of measuring the relative target position in a method for measuring and calibrating the relative position of an alignment camera and a calibration camera.

In block 602, the left camera module that has the first camera and a calibration camera is set up. In block 604, targets are set up in view of the left camera. For example, FIG. 3A is a diagram of an apparatus that may be used in a method for measuring and calibrating the relative position of the left alignment camera 10L and the calibration camera 20. A target assembly 70 comprises two targets 72, 74 rigidly secured in a frame 76. The target assembly is placed along axis 42 within the field of view of left alignment camera 10L such that both targets 72, 74 are visible to the camera. In this arrangement, camera 10L will see targets 72, 74 in approximately the configuration shown in FIG. 3B. Image 90 is produced by camera 10L, and includes target images 92 of targets 72, 74.

In block 606, a relative target position value is computed. For example, using known machine vision techniques, a data processor programmed according to appropriate software may receive image 90 and measure the location of each target 72, 74 based on target images 92. The data processor may then calculate a relative target position (RTP) value for each of targets 72, 74.

In block 608, the targets are set up such that one target is in view of the first camera, and another target is viewed by the calibration camera. For example, referring to FIG. 3C, the target assembly is moved such that one target 72, 74 is viewed by the left alignment camera 10L and the calibration camera 20, respectively. Movement of the target frame may be carried out manually by a technician who is performing the calibration, or using a motorized apparatus. In this position, the left alignment camera 10L forms an image similar to image 90 shown in FIG. 3D. Image 90 includes a target image 94 that represents the view by camera 10L of target 72. Current target location values are computed, as indicated by block 610. For example, a location value for each target 72, 74 with respect to each of the cameras is computed, using machine vision image analysis techniques.

The position of the first camera relative to the calibration camera is then computed, as shown by block 612. For example, based on the RTP value and the target location values, a value representing the relative camera position of the left alignment camera 10L with respect to the calibration camera 20 ("RCP Left Module value") is computed.

Overview of Calibrating Second Camera Module (The 2$^{nd}$ Camera and the Calibration Target)

Figure 4A:
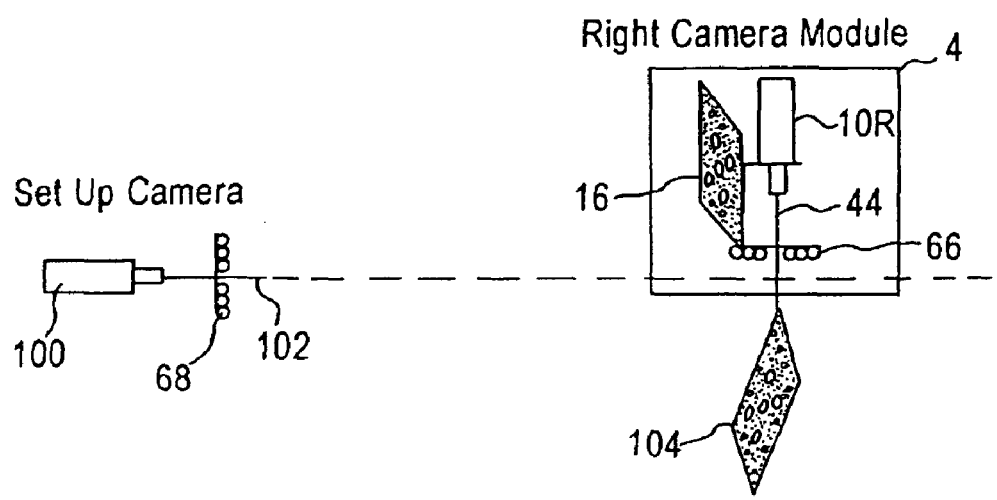
FIG. 4A is a diagram of an apparatus that may be used in a method for measuring and calibrating the relative position of an alignment camera and a calibration target.
Figure 4B:
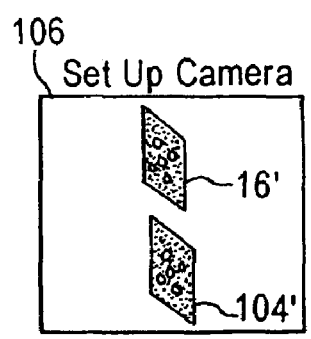
FIG. 4B is a diagram of a view seen by a setup camera of the apparatus of FIG. 4A.
Figure 4C:
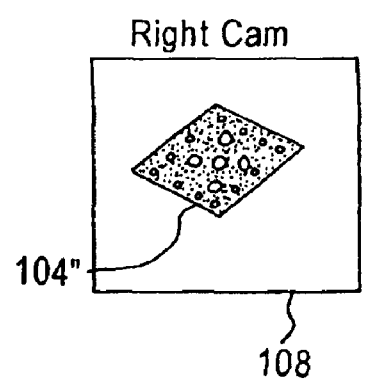
FIG. 4C is a diagram of a view seen by an alignment camera of the apparatus of FIG. 4A.
Figure 6B:
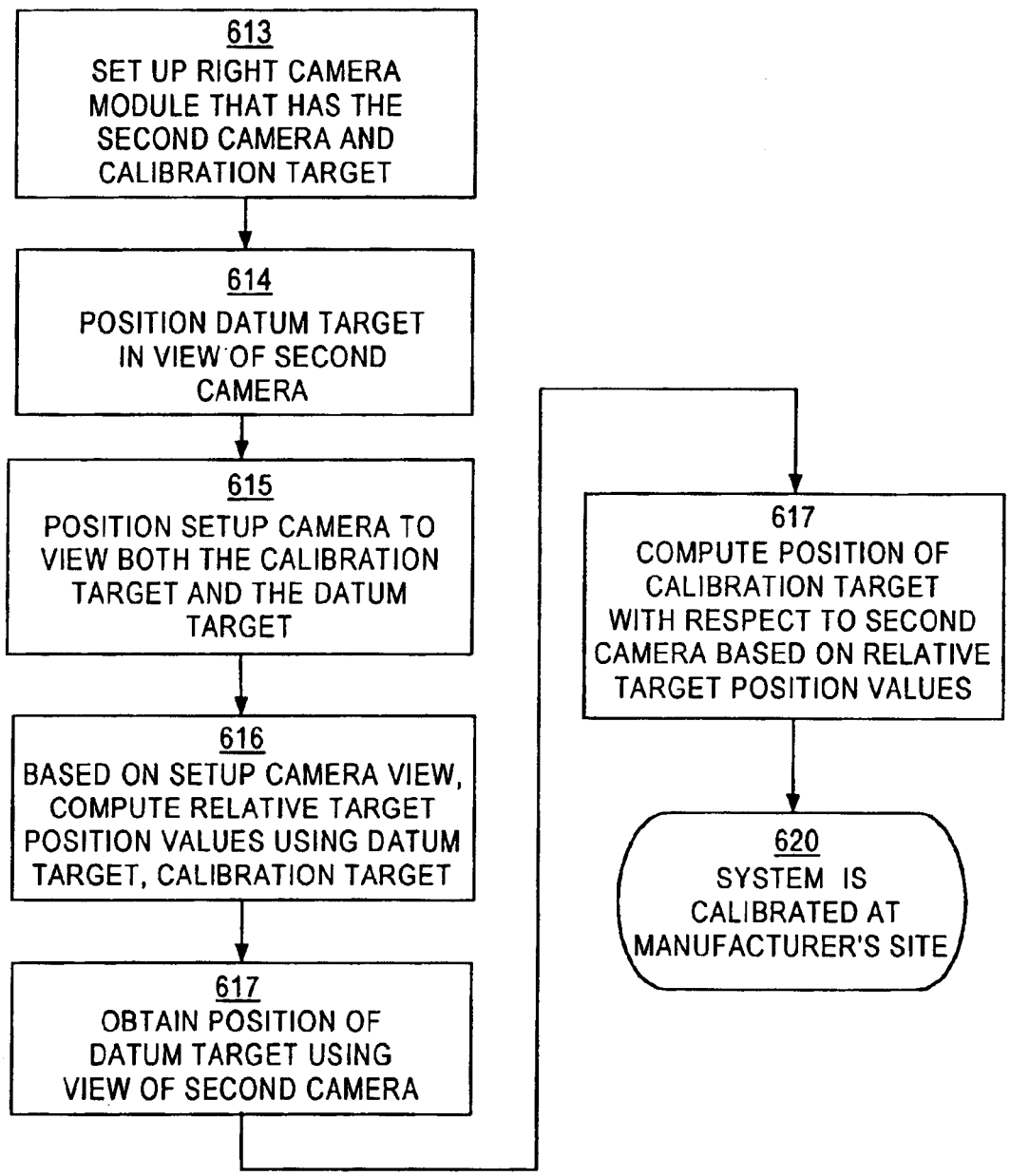
FIG. 6B is a flow diagram illustrating a process of calibrating a camera module having a camera and a calibration target.

A process for calibrating a pod or module that contains a camera and a target, e.g., right camera module 10R, is now described with reference to the flowchart of FIG. 6B. As shown in block 613, right camera module 10R is first set up. Right camera module 10R could be manufactured to high tolerances, but to reduce cost, a calibration approach involving measuring relative positions may be used. Generally, as illustrated in FIG. 4A, FIG. 4B, and FIG. 4C, a datum target is placed in view of the second camera. An additional camera ("set-up camera") is placed in a position to view both the calibration target and the datum target. The set-up camera in coordination with the computer measures the RTP of the two targets. The second camera measures the position of the datum target, and the computer determines the position of the calibration target with respect to the second camera, based on the RTP values.

FIG. 4A is a diagram of an apparatus that may be used in a method for measuring, and thus calibrating, the position of right camera 10R relative to the calibration target 16. This apparatus may be used when the relative position of the right camera and the calibration target are not known in advance. In one embodiment, the apparatus of FIG. 4A is created as part of a factory calibration process of an aligner.

As shown in block 614, a setup camera and an additional target ("datum target") may be placed in position. Datum target 104 is positioned in front of the right camera module 4 so that it is visible by right alignment camera 10R. An additional camera, setup camera 100, is positioned to the side of the right camera module 4 so that it can view both the datum target 104 and the calibration target 16.

Relative target position values are computed based on the position of the datum target and the calibration target, by using the view of the setup camera, as shown by block 616. For example, FIG. 4B is a diagram of a view 106 as seen by setup camera 100 in the foregoing configuration. View 106 includes a first image 16' of the calibration target and a second image 104' of the datum target 104. Using this view as input to a machine vision processing system, the position of datum target 104 and calibration target 16 is measured using the setup camera 100. These measurements yield values for the relative target positions of the datum target 104 and calibration target 16 ("RTP Set Up values").

In block 617, the relative position of the datum target to the second camera is obtained. As shown by block 618, a relative camera target to position value is computed, based on the relative target position setup values and the relative location of the datum target to the second camera.

For example, FIG. 4C is a diagram of a view 108 as seen by right alignment camera 10R in the foregoing configuration. View 108 includes a 2nd image 104" of the datum target 104. Using view 108 as input to a machine vision processing system, the position of datum target 104 with respect to the right alignment camera 10R is measured. Using values representing the relative location of datum target 104 to right alignment camera 10R, and the RTP Set Up values, a relative camera target position value (RCTP) is computed. The RCTP value represents the relationship of the right alignment camera 10R to the right calibration target 16.

At this point, the relative position of the left alignment camera 10L and the calibration camera 20 is now known in the form of the RCP Left Module value. Further, the relative position of the right alignment camera 10R to the calibration target 16 is also known in the form of the RCTP value. Since left alignment camera 10L is rigidly mounted with respect to calibration camera 20, and right alignment camera 10R is rigidly mounted to with respect to calibration target 16, their relative positions will not change. In one embodiment, the above steps are normally performed at the manufacturer's site where the aligner system is manufactured. The aligner system is thus calibrated at the manufacturer' site, as shown in block 620.

Using the System that has been Calibrated at the Manufacturer' Site.

Alignment may be carried out with a system that has been calibrated at the manufacturer' site. As indicated in FIG. 1, camera modules 2 and 4 have been placed in front of the vehicle to be aligned. The left camera module 2 is oriented so that left alignment camera 10L can view the left side of the vehicle and the calibration camera 20 can view calibration target 16 of the right camera module 4. The right camera module 4 has been positioned so that the right alignment camera 10R can view the right side of the vehicle and so that the calibration target 16 is visible to calibration camera 20, as in FIG. 1.

Figures 5A, 5B, 5C:
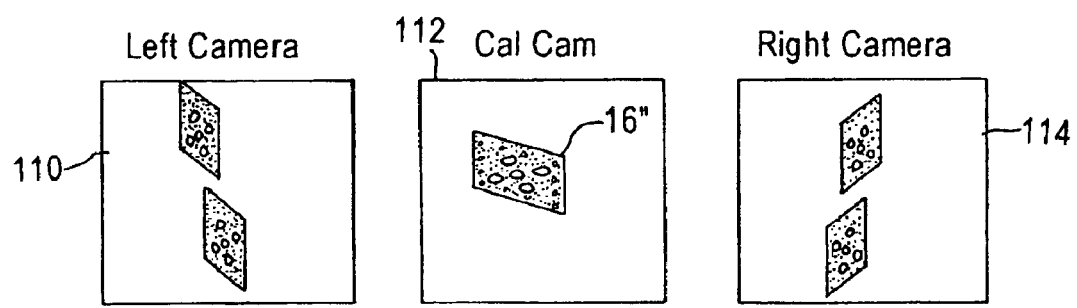
FIG. 5A is a diagram of a view of two wheel targets as seen by a first alignment camera of the apparatus of FIG. 1.
FIG. 5B is a diagram of a view seen by a calibration camera of the apparatus of FIG. 1 during calibration.
FIG. 5C is a diagram of a view of two wheel targets as seen by a second alignment camera of the apparatus of FIG. 1.

FIG. 5A is a diagram of a view 110 as seen by left alignment camera 10L in this configuration while an alignment operation is occurring. View 110 includes images of alignment targets 80a, 80b that are on the left wheels of the vehicle undergoing alignment.

FIG. 5B is a diagram of a view 112 as seen by calibration camera 20 in this configuration. View 112 includes an image 16" of calibration target 16.

FIG. 5C is a diagram of a view 114 as seen by right alignment camera 10R. View 114 includes images of alignment targets 80c, 80d that are on the right wheels of the vehicle undergoing alignment.

Figure 6C:
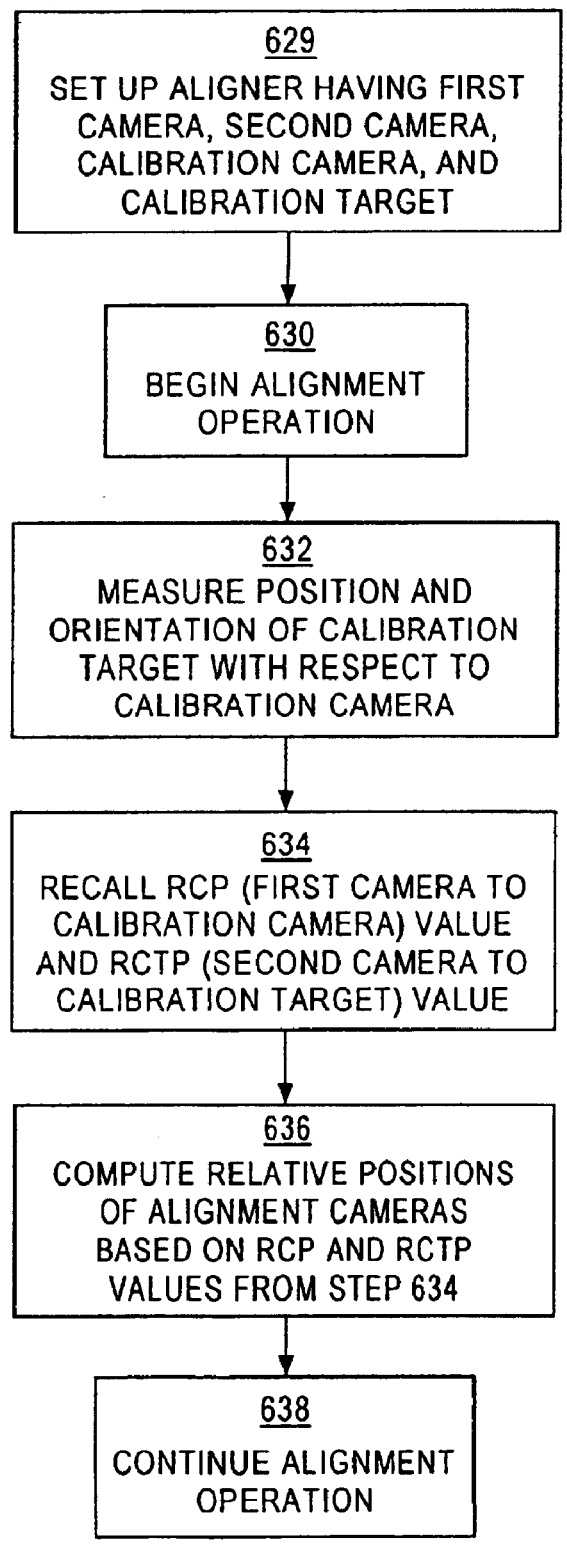
FIG. 6C is a flow diagram of an alignment process that includes carrying out camera calibration during an alignment.

FIG. 6C is a flow diagram of a process of carrying out camera calibration during a motor vehicle alignment operation, which, in one embodiment, is performed at a work site. In block 629, an aligner having a first camera, a second camera, a calibration camera, and a calibration target is setup as described above. In block 630, a motor vehicle wheel alignment operation or process is begun. Block 630 may involve moving a vehicle to an alignment rack, attaching wheel targets to the wheels of the vehicle, initializing the aligner, viewing wheel targets with the aligner cameras.

In block 632, the calibration camera measures the position and orientation of the calibration target with respect to the calibration camera. For example, when the aligner is installed, and at periodic intervals during use or during an alignment of a motor vehicle, calibration camera 20 may measure the position and orientation of calibration target 16 with respect to the calibration camera.

In block 634, an RCP value and an RCTP value are obtained, typically from memory. In one embodiment, these values are computed as described above and are stored in memory. Based on these values (the RCP Left Module value, the RCTP Right Module value, and the cal target position), values representing the relative positions of the left alignment camera 10L and the right alignment camera 10R are calculated, as shown in block 636. Such values are termed the relative camera position (RCP) of the aligner. The aligner may then look forward at the vehicle and proceed to measure the alignment of the vehicle, as shown by block 638.

The calibration process can be carried out in a "background" mode or background processor while the computer is carrying out other regular functions of an alignment.

Computation of the RCP value may be carried out at any time before, during, or after a vehicle alignment measurement. For example, computation of the RCP value could be carried out multiple times per second, once per day, at the start or end of the workday, as necessary to provide accurate alignments.

Variations

In an alternative embodiment, the foregoing apparatus and processes may be used without measuring the relative positions of calibration camera 20 and left alignment camera 10L of the left camera module 2, or the camera to target positions of the right camera module 4 in the factory, before the aligner is placed in service in a field environment or service shop. In this alternative, standard field calibration would be carried out, using the RCP procedure described in the above-noted patent references for computing the RCP of the first and second cameras, or an equivalent process. Thereafter, calibration camera 20 measures the position of calibration target 16. Calibration camera 20 periodically looks at calibration target 16 and measures its relative position. If such measurement indicates a change in the relative position of calibration camera 20 and target 16, then the left camera module 2 has moved with respect to the right camera module 4. The amount of change may be used to re-compute and update the RCP value for the aligner.

In still another alternative embodiment, to further simplify the process, after the RCP value for the aligner is computed, the relative position of the calibration camera 20 and calibration target 16 is measured. Periodically, this measurement is compared to the original measurement of the relative position of calibration camera 20 to calibration target 16, which was done at the time of installation of the aligner. If the two measurements are different, beyond a pre-determined tolerance, then the aligner informs the operator that the aligner is no longer calibrated. In response, the operator, or a service technician, may re-perform calibration, for example, using the RCP method.

In still another alternative embodiment, the aligner is provided with more than two (2) alignment camera modules. For each additional alignment camera module, the apparatus includes an additional calibration camera and calibration target. Each additional alignment camera module is calibrated according to the foregoing process, with additional processing steps to calibrate the additional module. Provided that each camera in each additional module is rigidly mounted with respect to its associated calibration target, the entire apparatus may be calibrated automatically.

In still another embodiment, the calibration camera and calibration target are mounted on different measuring modules. This configuration may be used with a non-contact aligner that uses one or more laser systems for determining whether wheels are in alignment.

Further, the processes described herein may be used in embodiments that use elements other than a camera to carry out the functions of calibration camera 20. Video cameras may be used in an embodiment, but are not required, and any suitable image-capturing device or nay conventional measuring device may be used. For example, gravity gauges or string gauges may be arranged to detect movement of one or more of the alignment cameras 10L, 10R with respect to one another or a fixed point. Alternatively, an LED light source may be affixed to one camera module to direct a light beam at a detector that is mounted on the opposite camera module. The detector determines a point of maximum light intensity over the detector surface, and if that point moves over time, then the cameras are determined to have moved, and the RCP value is updated, or a flag is set to indicate that the system is out of calibration.

Computer-Based Mathematical Computations

Figure 8:
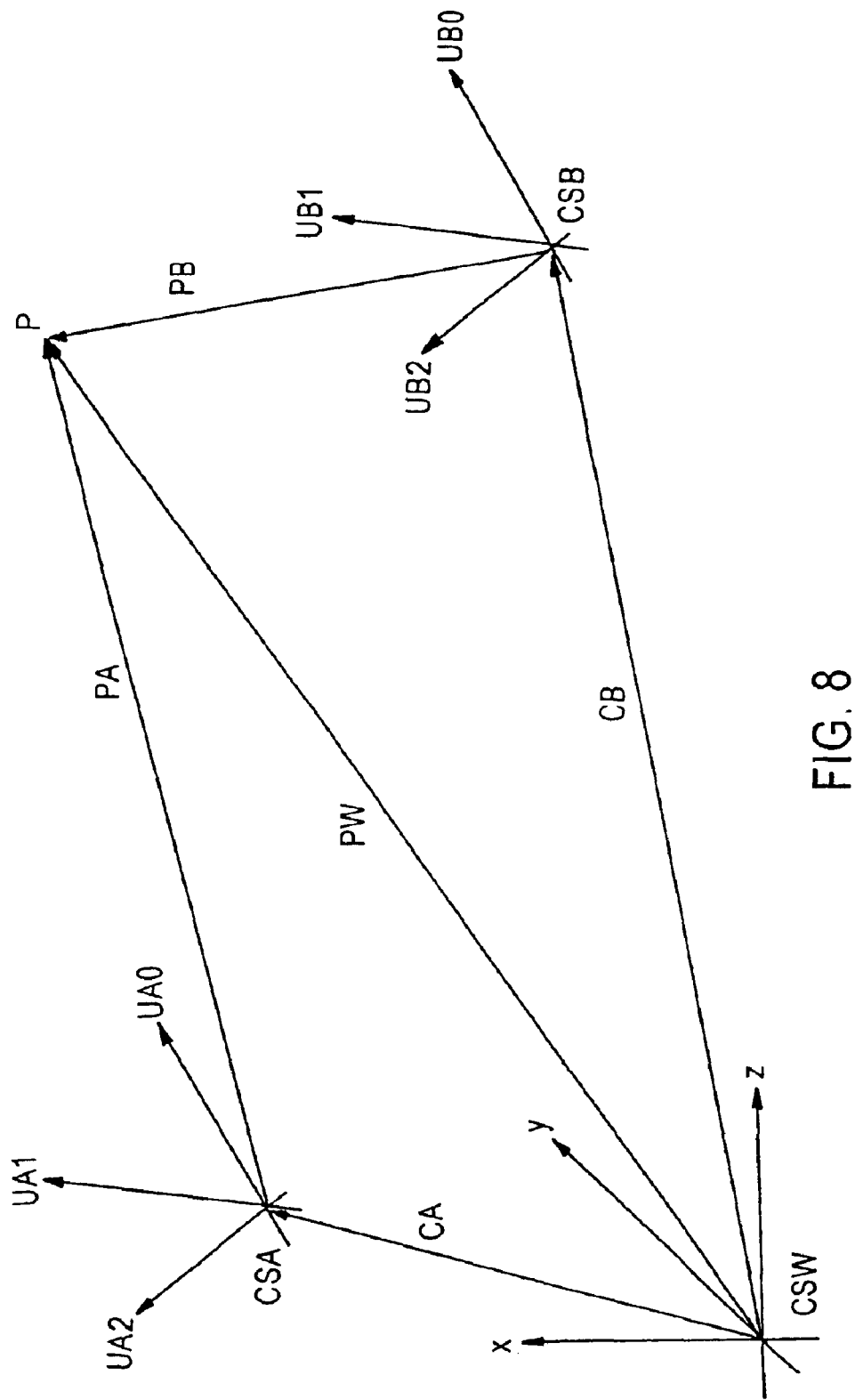
FIG. 8 is a simplified diagram of geometrical relationships of cameras and coordinate systems that provides a basis for computer-based mathematical computation of numeric values used in the above-described system.

FIG. 8 is a simplified diagram of geometrical relationships of cameras and coordinate systems that provides a basis for computer-based mathematical computation of numeric values used in the above-described system.

In FIG. 8, CSA (Coordinate System A) identifies a first three-dimensional coordinate system associated with a first alignment camera. CSB identifies a second coordinate system associated with a second alignment camera. CSW identifies a left wheel coordinate system that is used for reference purposes. CA is the vector from the origin of CSW to the origin of CSA. CB is the vector from the origin of CSW to the origin of CSB. P is a point in space.

PW is the vector from the origin of CSW to P. With respect to CSW, the components of PW are:

$PWx=PW \cdot x$ $PWy=PW \cdot y$ $PWz=PW \cdot z$ $PW=(PWx*x)+(PWy*y)+(PWz*z)$ where · indicates a dot product computation.

UA0, UA1, and UA2 are the unit vectors of CSA, i.e., its x, y, and z axes. With respect to CSW, the components of UA0 are:

$UA0x=UA0 \cdot x$ $UA0y=UA0 \cdot y$ $UA0z=UA0 \cdot z$

The components of UA1, UA2, UB0, UB1, and UB2 may be computed in a similar manner.

PA is the vector from the origin of CSA to P. With respect to CSA, the components of PA are:

$PA0=PA \cdot UA0$ $PA1=PA \cdot UA1$ $PA2=PA \cdot UA2$ $PA=(PA0*UA0)+(PA1*UA1)+(PA2*UA2)$ PB is the vector from the origin of CSB to P. With respect to CSB, the components of PB are:

$PB0=PB \cdot UA0$ $PB1=PB \cdot UA1$ $PB2=PB \cdot UA2$ $PB=(PB0*UA0)+(PB1*UA1)+(PB2*UA2)$ By vector addition, PW=CA+PA=CB+PB $PW=CA+PA$ $PWx = PW \cdot x = (CA + PA) \cdot x = CA \cdot x + PA \cdot x =$
$= ((PA0*UA0) + (PA1 + UA1) + (PA2*UA2)) \cdot x + CAx =$
$= (PA0*(UA0 \cdot x)) + (PA1*(UA1 \cdot x)) + (PA2*(UA2 \cdot x)) + CAx =$
$= (PA0*UA0x) + (PA1+ UA1x) + (PA2*UA2x) + CAx$ Therefore, $PWx=(PA0*UA0x)+(PA1*UA1x)+(PA2*UA2x)+CAx$ $PWy=(PA0*UA0y)+(PA1*UA1y)+(PA2*UA2x)+CAy$ $PWz=(PA0*UA0z)+(PA1*UA1z)+(PA2*UA2z)+CAx$ The foregoing relations may be expressed as a matrix expression of the form:

$$\begin{vmatrix} PWx \\ PWy \\ PWz \\ 1 \end{vmatrix} = \begin{vmatrix} UA0x & UA1x & UA2x & CAx \\ UA0y & UA1y & UA2y & CAy \\ UA0z & UA1z & UA2z & CAz \\ 0 & 0 & 0 & 1 \end{vmatrix} * \begin{vmatrix} PA0 \\ PA1 \\ PA2 \\ 1 \end{vmatrix}$$

or, $PW=MWA*PA$

Accordingly, in one embodiment, using computer storage, a 4×4 matrix of values MWA may be used to completely describe CSA with respect to CSW. The first three column 4-vectors of MWA are the unit 3-vectors of CSA with respect to CSW, with the fourth component having a value of zero. The last 4-vector of MWA is the 3-vector from the origin (center) of CSW to the origin of CSA, with respect to CSA. Its fourth component has a value of 1. These 4-vectors and 4×4 matrices are called "homogeneous coordinates."

The upper-left 3×3 matrix is just the rotation matrix relating CSA to CSW, and the right-most row is the translation.

Given any point with respect to CSA (i.e., the coordinates of the point in CSA, which are the components of the vector from the origin of CSA to the point with respect to the unit vectors of CSA), matrix MWA indicates how to compute the coordinates of the same point in CSW, namely, multiply PA (the coordinate vector with respect to CSA) by MWA to get PW (the coordinate vector with respect to CSW).

Having rendered values in terms of matrices, matrix mathematics may be used. Specifically, if PW=MWA*PA, then PA=MWA$^{-1}$*PW.

By the above definitions, the 4×4 matrix MWA$^{-1}$ completely characterizes or describes CSW with respect to CSA. The foregoing also applies if PA is replaced by PW, and MWA is replaced by MWA$^{-1}$. To get MWA$^{-1}$, the following process is used.

1. Transpose the upper left 3×3 matrix.
2. Replace the right-most column vector (CAx, CAy, CAz, 1), the vector from the origin of CSW to CSA, with respect to CSW, with (−CA0, −CA1, −CA2, 1), the vector from the origin of CSA to the origin of CSW—the latter is in the opposite direction from vector CA, from the origin of CSW to the origin of CSA—, with respect to CSA:

$$CA0=CA \cdot UA0=(CAx*UA0x)+(CAy*UA0y)+(CAz*UA0z)$$

$$CA1=CA \cdot UA1=(CAx*UA1x)+(CAy*UA1y)+(CAz*UA1z)$$

$$CA2=CA \cdot UA2=(CAx*UA2x)+(CAy*UA2y)+(CAz*UA2z)$$

and $$\begin{vmatrix} CA0 \\ CA1 \\ CA2 \end{vmatrix} = \begin{vmatrix} UA0x & UA0x & UA0z \\ UA1x & UA1y & UA1z \\ UA2x & UA2y & UA2z \end{vmatrix} * \begin{vmatrix} CAx \\ CA1 \\ CA2 \end{vmatrix}$$

The 3×3 matrix above is the transpose of the upper left 3×3 matrix in the 4×4 matrix MWA, the one that goes into the upper left 3×3 matrix positions of MWA$^{-1}$. Thus:

$$MWA^{-1} = \begin{vmatrix} UA0x & UA0x & UA0z & -CA0 \\ UA1x & UA1y & UA1z & -CA1 \\ UA2x & UA2y & UA2z & -CA2 \\ 0 & 0 & 0 & 1 \end{vmatrix}$$

For purposes of consistent notation, if 4×4 matrix MWA completely characterizes or describes CSA with respect to CSW, and MWA$^{-1}$ does the same for CSW with respect to CSA, then MWA$^{-1}$=MAW.

Further, if PW=MWA*PA, and PA=MWA$^{-1}$*PW= MAW*PW, then $$PW=MWB*PB, \text{ and } PB=MWB^{-1}*PW=MBW*PW$$

Since the same PW is used in both expressions, then $$MWA*PA=MWB*PB=PW$$

$$MWA^{-1}*MWA*PA=MWA^{-1}*MWB*PB$$

But since MWA$^{-1}$*MWA is the identity matrix, then $$PA=MWA^{-1}*MWB*PB=MAW*MWB*PB=MAB*PB$$

and therefore, $$MAB=MWA^{-1}*MWB=MAW*MWB$$

The 4×4 matrix MAB completely characterizes or describes CSB with respect to CSA. Thus, MAB is the RCP or RTP matrix.

In one exemplary software implementation, a VECTOR structure is defined as an array of three numbers; a MATRIX structure is defined as an array of three VECTORs; and a PLANE structure is a MATRIX and a VECTOR. The MATRIX is the 3×3 rotation matrix, whose VECTORs are the three unit vectors of the coordinate system, and the VECTOR is the vector to the origin of the coordinate system. All such VECTORs' components are expressed with respect to a base coordinate system.

In one exemplary function, Plane 1 defined relative to WCS is MWA; Plane 2 defined relative to WCS is MWB; Plane 2 defined relative to plane 1 is MAB; Plane 1 defined relative to plane 2 is MBA. Then, a function may be defined having the API,

--- void mat3Plane21To2W (PLANE *p1, PLANE *p21, PLANE *p2w)
/*
Given plane 1 defined relative to WCS (MWA)
Given plane 2 defined relative to plane 1 (MAB)
Return plane 2 defined relative to WCS (MWB)
*/

---

Using matrix notation: MWB=MWA*MAB $$\begin{vmatrix} UA0x & UA1x & UA2x & CAx \\ UA0y & UA1y & UA2y & CAy \\ UA0z & UA1z & UA2z & CAz \\ 0 & 0 & 0 & 1 \end{vmatrix} * \begin{vmatrix} UAB00 & UAB10 & UAB20 & CAB0 \\ UAB01 & UAB11 & UAB21 & CAB1 \\ UAB02 & UAB12 & UAB22 & CAB2 \\ 0 & 0 & 0 & 1 \end{vmatrix}$$

The upper left 3×3 of the product 4×4 matrix MWB is the product of the upper left 3×3 matrix values of MWA and MAB, as a result of the zero values in the bottom row of all the 4×4 matrices. The rightmost column of the product 4×4 matrix MWB is the sum of the product of the upper left 3×3 of MWA and the rightmost column vector of MAB, and the rightmost column vector of MWA, also because of the zero values and the one value in the bottom row of all the 4×4 matrices.

To save computational time, in one embodiment, no multiply operations are carried out by zero or one for the bottom rows of the 4×4 matrices. Accordingly, 3×3 matrix and 3-vector multiply, add, and transpose operations are carried out.

Similar functions may be defined for other transformations, as follows:

--- void mat3Plane2WTo21 (PLANE *p1, PLANE *p2w, PLANE *p21)
/*
Given plane 1 defined relative to WCS (MWA)
Given plane 2 defined relative to WCS (MWB)
Return plane 2 defined relative to plane1 (MAB)
*/

---

Using matrix notation: MAB=MAW*MWB= MWA$^{-1}$*MWB

--- void mat3Plane12To2 (PLANE *p1, PLANE *p12, PLANE *p2)
/*
Given plane 1 defined relative to WCS (MWA)
Given plane 1 defined relative to plane 2 (MBA)
Return plane 2 defined relative to WCS (MWB)
*/

---

Using matrix notation: MWB=MWA*MAB= MWA*MBA$^{-1}$

The discussion above observes that a 4×4 matrix of values MWA may be used to completely describe CSA with respect to CSW. Further, the inverse of MWA, matrix $MWA^{-1}$, completely describes CSW with respect to CSA. Accordingly, $$MWA^{-1}=MAW$$

$$MAB=MWA^{-1}*MWB=MAW*MWB$$

Figure 3B:
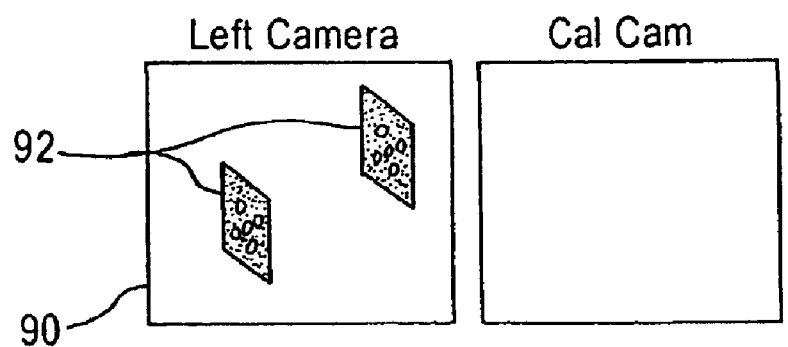
FIG. 3B is a diagram of a view seen by a camera.
Figure 3C:
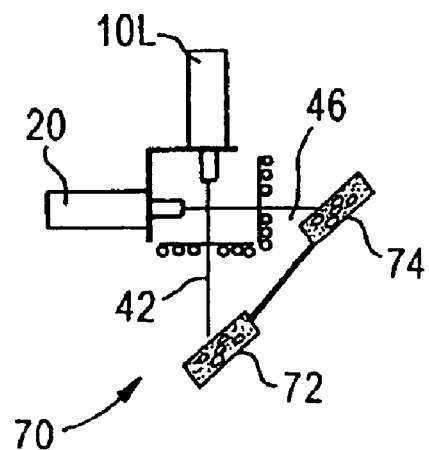
FIG. 3C is a diagram of an apparatus that may be used in the step of measuring the relative camera position in a method for measuring and calibrating the relative position of an alignment camera and a calibration camera.
Figure 3D:
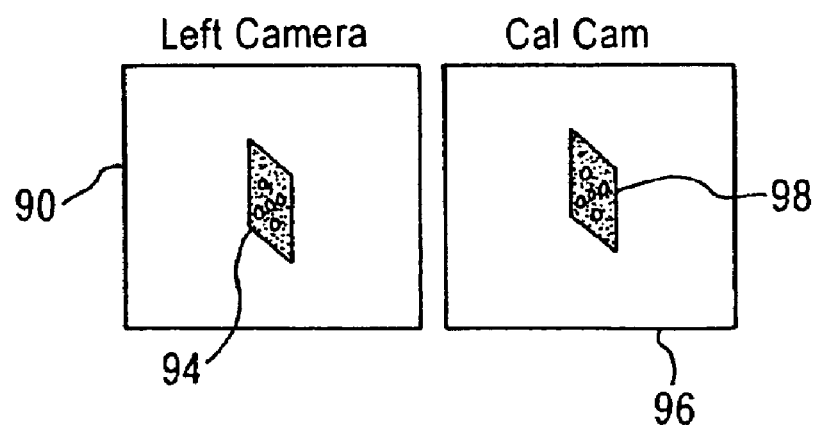
FIG. 3D is a diagram of views seen by an alignment camera and a calibration camera.

Using machine vision analysis techniques, the above-described system make take a camera image of a target, e.g., image 90 of FIG. 3B, and compute the coordinate system of the target with respect to the camera.

A computation of relative target position (RTP) is now described with reference to FIG. 3A. For purposes of computing RTP:

Let CSL be the coordinate system of left camera 10L.
Let CSA be the coordinate system of target 72.
MLA represents CSA with respect to CSL.
Let CSB be the coordinate system of target 74.
MLB represents CSB with respect to CSL.

Given left camera image 90 containing images 92 of targets 72 and 74, machine vision analysis techniques result in creating and storing matrices MLA and MLB. According, the RTP (between target 72 and 74) value is given by $$RTP=MAB=MAL*MLB=MLA^{-1}*MLB$$

Based on this, the system may compute MLA from MLB and the opposite, by $$MLA=MLB*MBA=MLB*RTP^{-1}$$

$$MLB=MLA*MAB=MLA*RTP$$

When the value of RTP is created and stored, target assembly 70 may be moved so that the left camera 10L sees target 72 and the calibration camera 20 sees target 74. Let CSC be the coordinate system of the calibration camera 20. Given left camera image 90, containing image 94 of target 70 (FIG. 3D), and calibration camera image 96 containing image 98 of target 74 (FIG. 3D), machine vision analysis techniques result in creating and storing matrices MLA, which describes CSA with respect to CSL, and MCB, which describes CSB with respect to CSC.

Based on such matrices, the value of the relative camera position RCP of the left camera 10L with respect to the calibration camera 20 may be computed as:

$$MCL=MCB*MBL=MCB*MLB^{-1}=MCB*(MLA*RTP)^{-1}32$$
$$MCB*RTP^{-1}*MLA^{-1}$$

and the value of the relative camera position RCP of the calibration camera 20 with respect to the left camera 10L may be computed as:

$$MLC=MLB*MBC=MLB*MCB^{-1}=MLA*RTP*MCB^{-1}$$

Now a computation of values for the right camera 10R is presented. Referring now to FIG. 4A, Let CSS be the coordinate system of the setup camera 100.
Let CSR be the coordinate system of the right camera 10R.
Let CSQ be the coordinate system of the calibration target 16.
Let CSD be the coordinate system of the datum target 104.

Given setup camera image 106 of FIG. 4B, containing images 16' and 104' of calibration target 16 and datum target 104, machine vision analysis techniques result in creating and storing matrices MSQ, which describes CSQ with respect to CSS, and MSD, which describes CSD with respect to CSS. Further, given right camera image 108, containing image 104" of the datum target 104, machine vision analysis techniques result in creating and storing a matrix MRD, which describes CSD with respect to CSR. MAQ describes the RTP between the calibration target 16 and the datum target 104 (CSD with respect to CSQ).

Then the coordinate system of the calibration target 16 with respect to the right camera, that is, CSQ with respect to CSR, is given by $$MRQ=MRD*MAQ=MRD*(MDS*MSQ)=MRD*MSD^{-1}*MSQ$$

Accordingly, a value of MLC, which describes the calibration camera with respect to the left camera, and MRQ, which describes the calibration target with respect to the right camera, may be computed.

In ordinary operation, the system produces images of the type shown in FIG. 5A, FIG. 5B, FIG. 5C. The left camera 10L produces image 110 (FIG. 5A) of the two left wheel targets. Machine vision analysis techniques result in creating and storing values for the coordinate systems of the wheel targets in the left camera coordinate system. If the left camera coordinate system is defined as the world coordinate system, then the left wheel targets are transposed into the world coordinate system.

Calibration camera 20 produces image 112 (FIG. 5B) of the calibration target. Machine vision analysis techniques result in creating and storing values for the coordinate system of the calibration target in the calibration camera coordinate system, MCQ.

The right camera 10L generates image 114 of FIG. 5C of the two right wheel targets. Machine vision analysis techniques result in creating and storing values for the coordinate systems of these wheel targets in the right camera coordinate system, MRW wherein "W" refers to "wheel" rather than "world". Generally, the left camera coordinate system serves as the world coordinate system.

The right wheel target values may be transposed into the same world coordinate system as the left wheel targets by computing MLW, the right wheel targets in the left (world) coordinate system. From the calibration process, values of MLC and MRQ are known. The system measures MCQ based on the image of FIG. 5B and MRW based on the image of FIG. 5C. Accordingly, $$MLW=MLR*MRW=MLC*MCR*MRW=MLC*MCQ*MRQ^{-1}*MRW$$

Hardware Overview

Figure 7:
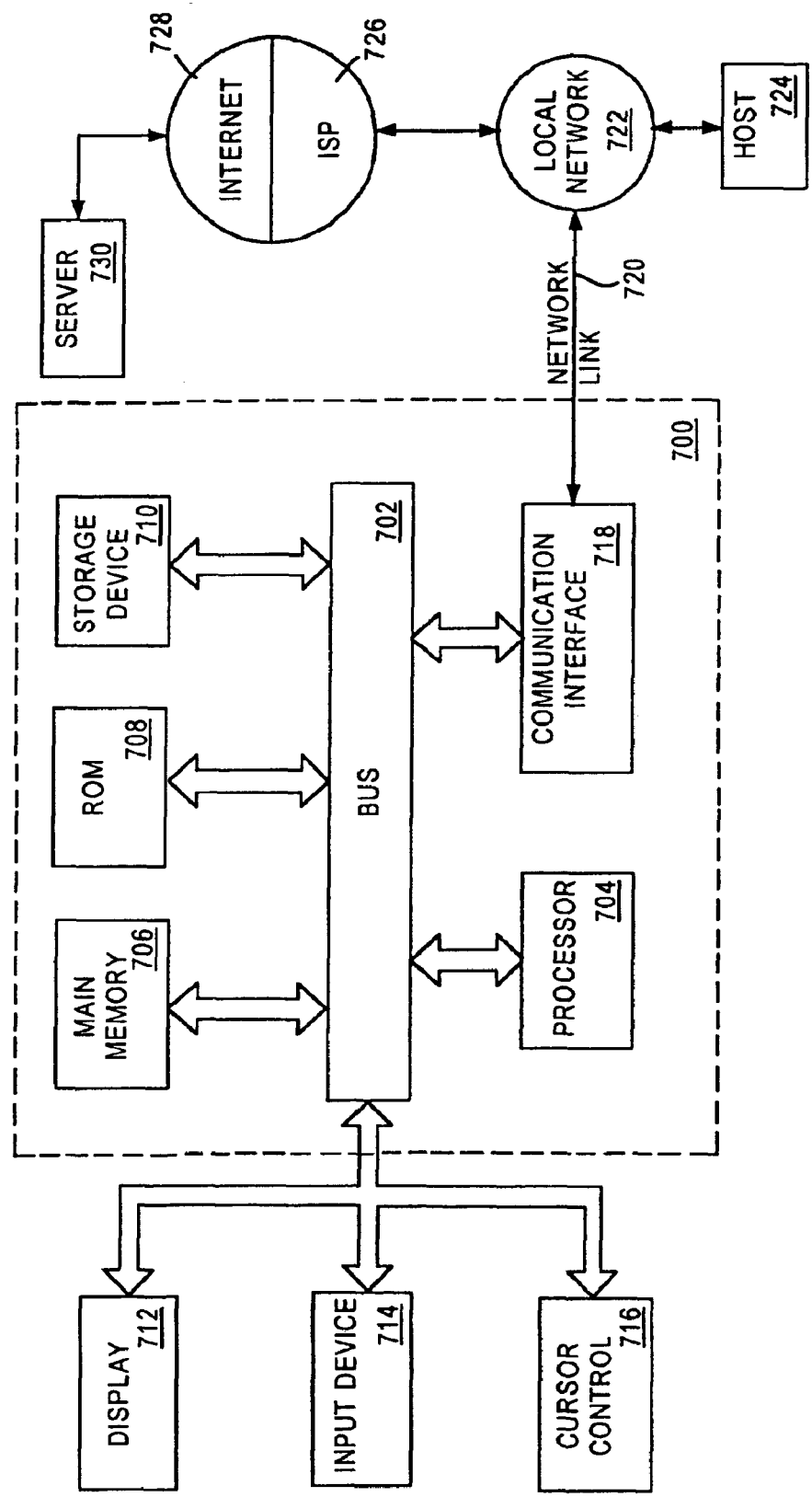
FIG. 7 is a block diagram of a computer system with which an embodiment may be implemented.

FIG. 7 is a block diagram that illustrates a computer system 700 upon which an embodiment of the invention may be implemented. Computer system 700 may be used as the arrangement for some or all of device 100 or for the arrangement of an external computer or workstation that communicates with device 100.

Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Embodiments of the invention are related to the use of computer system 700 for automatic calibration of an aligner. According to one embodiment of the invention, automatic calibration of an aligner is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with embodiments of the invention, one such downloaded application provides for automatic calibration of an aligner as described herein.

The received code may be executed by processor 704 as it is received, and/or stored in storage device 710, or other non-volatile storage for later execution. In this manner, computer system 700 may obtain application code in the form of a carrier wave.

Advantages and Further Variations

The embodiments disclosed in this document are adaptable to other contexts. In particular, the embodiments are useful in calibrating any machine vision measuring system that has more than one camera. Further, the embodiments may be used in connection with alignment of a recreational vehicle (RV). An aligner for RVs normally requires a wider boom than a standard aligner. Using the embodiments disclosed in this document, an aligner for RVs may be constructed simply by bolting its uprights slightly further apart, with no new hardware.

Because the apparatus described above is self-calibrating, it can be incorporated in a portable aligner, because calibration after setup is not required. A portable alignment operation could be carried out using two cameras on a tripod in a parking lot, garage, or similar environment without the time consuming calibration. Thus, the apparatus could be used to facilitate an entirely new service, remote or on-site alignment.

Further, techniques described above to measure (or calibrate) the relative position of the left camera to the right camera may be employed in a system that has a plurality of devices. These techniques are used to measure the relative position of one device of the plurality of devices with respect to another device of the plurality of devices. In these conditions, any pair of devices of the plurality of devices that includes a first device and a second device may be treated as the pair of the left camera and the right camera in the above-described techniques. A calibration device is then mounted near the first device wherein the relative position of the calibration device to the first device is predetermined. Similarly, a calibration target is mounted near the second device wherein the relative position of the calibration target to the second device is also predetermined. The relative position of the calibration device to the calibration target is then measured. Finally, the relative position of the first device to the second device is calculated based on 1) the relative position of the calibration device to the first device, 2) the relative position of the calibration target to the second device, and 3) the relative position of the calibration device to the calibration target. In one embodiment, the calibration device is configured to measure the relative position of the calibration device to the calibration target.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for calibrating a machine measuring system that has a first measuring device and a second measuring device, wherein the first measuring device and the second measuring device are image-capturing devices remote to a vehicle to undergo a measurement for capturing images of at least one target attached to the vehicle, the apparatus comprising:

a first calibration device mounted in a known relationship to the first measuring device;

second calibration device mounted in a known relationship to the second measuring device, wherein the first calibration device and the second calibration device coordinately generate measurements of a relative position between the first calibration device and the second calibration device;

a memory device for storing a reference value that represents a reference position of the first calibration device relative to the second calibration device; and a data processor, coupled to the first measuring device, the second measuring device, and at least one of the first calibration device and the second calibration device, and configured to repeatedly receive signals representing the relative position between the first calibration device and the second calibration device, and determine vehicle parameters based on the images of the at least one target, the known relationship of the first measuring device relative to the first calibration device, the known relationship of the second measuring device relative to the second calibration device, and based on the relative position between the first calibration device and the second calibration device;

wherein the data processor is further configured to periodically compare the reference value with a measurement coordinately generated by the first calibration device and the second calibration device representing an updated relative position between the first calibration device and the second calibration device.

2. An apparatus as recited in claim 1, wherein the first calibration device comprises a light source mounted in fixed relationship to the first measuring device and the second calibration device comprises a light detector mounted in fixed relationship to the second measuring device and having an output coupled to the data processor.

3. A computer-readable medium bearing instructions for calibrating a machine measuring system that has a first measuring device, a second measuring device, first calibration device attached to the first measuring device in a known positional relationship, second calibration device attached to the second measuring device in a known positional relationship and a data processing system coupled to the first measuring device, the second measuring device, and at least one of the first calibration device and the second calibration device, wherein the first measuring device and the second measuring device are image-capturing devices remote to a vehicle for capturing images of at least one target attached to the vehicle, and the first calibration device and the second calibration device coordinately generate measurements of a relative position between the first calibration device and the second calibration device, the computer-readable medium comprising instructions, upon execution by the data processing system, that control the data processing system to perform the steps of:

receiving a periodically updated signal representing an updated relative position between the first calibration device and the second calibration device from at least one of the first calibration device and the second calibration device;

accessing a reference value that represents a reference position of the first calibration device relative to the second calibration device;

determining vehicle parameters based on the images of the at least one target, the known positional relationship of the first measuring device relative to the first calibration device, the known positional relationship of the second measuring device relative to the second calibration device, and the relative position between the first calibration device and the second calibration device; and periodically comparing the reference value with the undated relative position between the first calibration device and the second calibration device.

4. vehicle alignment system comprising:

a first image-capturing device remote to a vehicle for capturing images of a first target positioned at a first known relationship to the vehicle;

a second image capturing device remote to the vehicle for capturing images of a second target positioned at a second known relationship to the vehicle;

first calibration device having a known positional relationship relative to the first image-capturing device;

second calibration device having a known positional relationship relative to the second image-capturing device, wherein the first calibration device and the second calibration device coordinately generate measurements of a relative position between the first calibration device and the second calibration device;

a data processing system configured to form signal communication with the first image-capturing device, the second image-capturing device and at least one of the first calibration device and the second calibration device, wherein the data processing system includes a data storage device storing instructions, upon executed by the data processing system, controlling the data processing system to perform the steps of:

receiving a signal representing an updated relative position between the first calibration device and the second calibration device from at least one of the first calibration device and the second calibration device;

accessing a reference value that represents a reference position of the first calibration device relative to the second calibration device;

determining alignment parameters of the vehicle based on the images of the first target and the second target, the known positional relationship of the first image-capturing device relative to the first calibration device, the known positional relationship of the second image-capturing device relative to the second calibration device, and the relative position between the first calibration device and the second calibration device; and periodically comparing the reference value with the updated relative position between the first calibration device find the second calibration device.

* * * * *